United States Patent
Rautiola et al.

[11] Patent Number: 5,991,639
[45] Date of Patent: Nov. 23, 1999

[54] SYSTEM FOR TRANSFERRING A CALL AND A MOBILE STATION

[75] Inventors: Markku Rautiola, Tampere; Juha Kalliokulju, Vesilahti; Toni Sormunen, Saaksjarvi; Harri Halminen, Kangasala, all of Finland

[73] Assignee: Nokia Mobile Phones Limited, Espoo, Finland

[21] Appl. No.: 08/940,398

[22] Filed: Oct. 1, 1997

[30] Foreign Application Priority Data

Oct. 2, 1996 [FI] Finland .................................. 963936

[51] Int. Cl.⁶ .................................................. H04B 7/00
[52] U.S. Cl. ...................... 455/553; 455/557; 379/93.05; 370/338
[58] Field of Search ..................... 455/556, 557, 455/558, 575, 552, 553; 379/33, 301, 357, 93.05, 93.09; 370/338

[56] References Cited

U.S. PATENT DOCUMENTS

| | | | |
|---|---|---|---|
| 4,887,290 | 12/1989 | Dop et al. ................................. | 379/33 |
| 5,175,758 | 12/1992 | Levanto et al. . | |
| 5,349,630 | 9/1994 | Sointula . | |
| 5,446,783 | 8/1995 | May ...................................... | 455/556 |
| 5,526,403 | 6/1996 | Tam ...................................... | 455/552 |
| 5,633,920 | 5/1997 | Kikinis et al. .......................... | 379/357 |
| 5,636,264 | 6/1997 | Sulavuori et al. . | |
| 5,796,727 | 8/1998 | Harrison et al. ........................ | 370/338 |
| 5,835,862 | 11/1998 | Nykanen et al. ....................... | 455/558 |

FOREIGN PATENT DOCUMENTS

| | | |
|---|---|---|
| 0462728 A3 | 12/1991 | European Pat. Off. . |
| 0599632 A2 | 6/1994 | European Pat. Off. . |
| 0660628 A2 | 6/1995 | European Pat. Off. . |
| WO 95/01070 | 1/1995 | WIPO . |

*Primary Examiner*—Paul Loomis
*Attorney, Agent, or Firm*—Perman & Green, LLP

[57] ABSTRACT

The scope of the present invention is an information transfer system and a mobile station (10) connected to it. In a system according to the invention a mobile station (10) is connected to a terminal device (40) e.g. through either a cable or an infrared connection, and the radio parts of the mobile station (10) are switched off. Through the terminal device (40), a local network, ATM-network (70, 81, 80, 82) and a network server (90) the mobile station (10) is connected over a wired network to a mobile communication switching center (100) or to a telephone network exchange (110, 130). When the connection from the mobile station (10) to a mobile communication switching center (100) or to a telephone network exchange (110, 130) is broken, the mobile station (10) establishes a connection to a mobile communication switching center (100) by radio in the normal way through a base station (105) and a base station controller (104).

16 Claims, 8 Drawing Sheets

SYSTEM FOR TRANSFERRING A CALL AND A MOBILE STATION

FIELD OF THE INVENTION

The present invention relates to a mobile station operating in a mobile communication network, which mobile station comprises connecting means for establishing a telecommunication connection and transferring information between a mobile station and a subscriber device connected to the telecommunication network over said telecommunication network.

BACKGROUND OF THE INVENTION

In modern office work it is necessary to provide the employees with versatile information transfer connections which can transfer speech, facsimile messages, electronic mail and other data—usually in digital form. Transfer of information is needed inside an office or corresponding working environment for communication between employees, for transfer of information between branch offices of an enterprise, which offices can be in other towns or even in other countries, and for communication between the office and "outside world". In this text and all of the following text "office" stands for an environment with several users, which users "belong together", and which office physically covers a reasonably limited area. There has been a trend in the telecommunication branch toward integrated systems in which various forms of telecommunication can be controlled as one entity.

A conventional realization of an above mentioned type of office communication system comprises a company telephone exchange for providing telephone services and telephones connected to it over twisted-pair connections and a separate local area network (LAN) in which applications for advanced telecommunication services have been implemented and which has the intelligence to run them. The local network is connected to the telephone exchange using a telecommunication server (Telephony Server) which supports the traditional subscriber server architecture in which subscribers are subscribers' computers connected to the local network. For example call-, data-, facsimile-, electronic mail- and speech mail services are connected within an office utilizing the telecommunication server. In an integrated system users can also e.g. control telephone services using their computer terminals connected to the local network. The whole integrated office communication system is connected to public telephone network through the telephone exchange.

FIG. 1 presents an example of a prior known office communication system in which users' telephones TP (TelePhone) have been connected by wire connections and a local area network (LAN) has been connected over a telecommunication server TS (Tele Server) into a telephone exchange PBX (Private Branch Exchange) which is connected to a public telephone network PSTN/ISDN (PSTN, Public Switched Telephone Network, ISDN, Integrated Services Digital Network). To the local area network (LAN) have been connected on one hand servers executing various services such as data base server DBS (Data Base Server), voice server VS (Voice Server) and electrical mail server EMS (Electrical Mail Server) and on the other hand the users' computers PC (Personal Computer). It can be regarded as a problem with this kind of realization that even if a user's telephone TP and computer PC usually are on the same table next to each other separate wire connections must be laid to the user's working room for them, on one hand from the telephone exchange PBX and on the other hand from the telecommunication server TS of the LAN. Building and maintenance of two overlapping telecommunication networks naturally causes cost.

The problem of overlapping telecommunication networks is increased by portable mobile stations utilizing radio connection coming rapidly more popular. Many persons working in an office need, because of their mobile work, a mobile station and often also a portable facsimile device and/or a combined portable computer/mobile station. In order to be able to use the devices based on radio connection also inside buildings, the constructions of which attenuate radio signals, it has been suggested that mobile radio networks should be supplemented with small base stations individual for offices or even for rooms, which base stations would be connected either directly or over wired telephone network to the central systems of mobile communication network. The network of small base stations would be already a third overlapping telecommunication network within the same office, and accordingly it is clear that in a preferable solution, which the present invention is aiming at, also the arrangement supporting radio communication stations should be realized using essentially the same means and telecommunication networks than the rest of the transfer of information in the office.

A challenge of its own to telecommunication systems is issued by the fact that work is done more and more in small-office or domestic environment, which is described by the concept SOHO (Small Office, Home Office). Even here advanced office communication services are often needed and it is particularly preferable if such a flexible system is available which can be utilized even both in the office and at home. The present systems which require overlapping connections for the utilization of mobile communication services, conventional telephone services and fast data transfer services are very inflexible for working in a small- or home office. In addition to above, the following kinds of solutions connected with integrated telecommunication systems are known from prior art.

EP publication 599 632 presents a wireless local network designed to replace the present kind of wired local networks (e.g. registered trade marks Ethernet and Token Ring) by a radio transfer network which forms inside an enterprise a private cellular system designed for data transfer. A network utilizing radio connection is, however, relatively expensive to realize and it is more sensitive to interference than a local network based upon wired connections. In addition to that it requires establishing of an extra radio network in addition to previous networks.

EP publication 462 728 presents an intelligent base station controller, subordinated to which at least one radio communication system base station is operating and which is capable of connecting calls from a certain mobile station coming through the base station directly to the wired telephone network. This system, however, requires said additional base stations, which increases the cost. The system is also, alike the system presented in publication 599 632, sensitive for external (radio)interference.

If an integrated office communication system is realized utilizing traditional technique, separate wired connections must be laid into a user's working room on one hand from telephone exchange PBX (FIG. 1) and on the other hand from telecommunication server TS of local area network (LAN). Constructing and maintaining two overlapping networks naturally brings extra cost. In said solutions according to prior art a solution to this problem has not actually been striven for.

SUMMARY OF THE INVENTION

The target of the present invention is to present a system which reduces the problems caused by overlapping networks. Additionally, the purpose of the invention is to reduce problems caused by wireless information transfer inside an office and extra cost. A further target of the invention is to present an arrangement, in which said system, integrating information transfer, can also serve home office- and small office users. A further target of the invention is to present an arrangement of said kind, in which the same devices can be used as terminal devices (e.g. mobile stations) in the telecommunication system both in the office and outside it.

Now a system has been invented for transfer of information, e.g. speech or data, in which the trunk of information transfer is inside the office a local network (e.g. local area network, LAN), and between office units e.g. a traditional telephone network utilizing wired connections or a fast data packet network utilizing ATM (Asynchronous Transfer Mode) technique.

In an information transfer system according to the invention the services normally provided by a telephone exchange and a telephone network have been moved to a local network to be provided by e.g. a server connected to the local network. Such services are e.g. internal calls within the enterprise. It is possible to perform the tasks of a traditional telephone exchange also in the traditional way, manually and personally, in which case it is possible to operate the telephone exchange using a terminal connected to the local network. Traditional telephones have been replaced with mobile stations according to the invention, which, while in the office, are connected to a terminal device, typically a computer, either over a cable, an infrared connection, or low-power radio transceivers. In this case the traditional radio frequency parts of the mobile station are switched off and the mobile station is connected to the telephone network through the terminal device, the local network and a specific telecommunication server. In this case the mobile station does not contact the telephone network using radio frequencies, not loading the mobile communication network, the possibly poor field strength inside the house does not inflict the quality of the connection, and no cost for using the mobile communication network radio channels is involved. If the mobile station according to the invention has not been connected to a terminal device (even if the user is in the office), the mobile station according to the invention operates like a traditional mobile station.

According to one embodiment of the invention the mobile station may be connected to the terminal device by means of a connection device, having a functional connection to the terminal device, and having means for connecting functionally to the mobile station. In response to connecting a mobile station to the connection device, the system will be informed to direct calls to the mobile station via the data communication network. The connection device can be a desktop stand or desktop charger and may be a separate device or integrated into the terminal device.

The system for transferring information according to the invention, comprises a mobile station operating in a mobile communication network, which mobile station comprises first connecting means for establishing a telecommunication connection and transferring information between the mobile station and a subscriber terminal connected to telecommunication network through said mobile communication network, and means for directing calls to the mobile station on basis of a first identifier via the mobile communication network, the system being wherein it further comprises a data communication network connected to the telecommunication network, a terminal device connected to the data communication network, second connecting means for connecting said mobile station into a functional connection with said terminal device, means for establishing a telecommunication connection and transferring information between said mobile station and said subscriber terminal through said terminal device and said data communication network, and means for directing calls to the mobile station on basis of a second identifier via said data communication network and said terminal device.

The mobile station according to the invention comprises first connecting means for establishing a telecommunication connection and transferring information between a mobile station and a subscriber terminal connected to a telecommunication network through a mobile communication network, means for receiving calls on basis of a first identifier via the a mobile communication network, wherein the mobile station further comprises second connecting means for connecting the mobile station into a functional connection with a terminal device, which terminal device has a connection to telecommunication network and for establishing a telecommunication connection and for transferring information between said mobile station and said subscriber terminal through said terminal device, and means for receiving calls on basis of a second identifier via said terminal device.

A subscriber device means a terminal device connected to a telecommunication network, such as a telephone connected to a fixed telephone network, and a mobile station connected to a mobile communication network. A subscriber device also means servers and telephone exchanges connected to telecommunication networks, providing telecommunication services to the users of the telecommunication networks. In other words, a subscriber device means all the parts of a telecommunication network with which a telecommunication terminal device (e.g. a telephone) can communicate over a telecommunication network.

BRIEF DESCRIPTION OF THE DRAWINGS

The invention is described in detail in the following with reference to enclosed figures, of which

DETAILED DESCRIPTION

Figure 1:
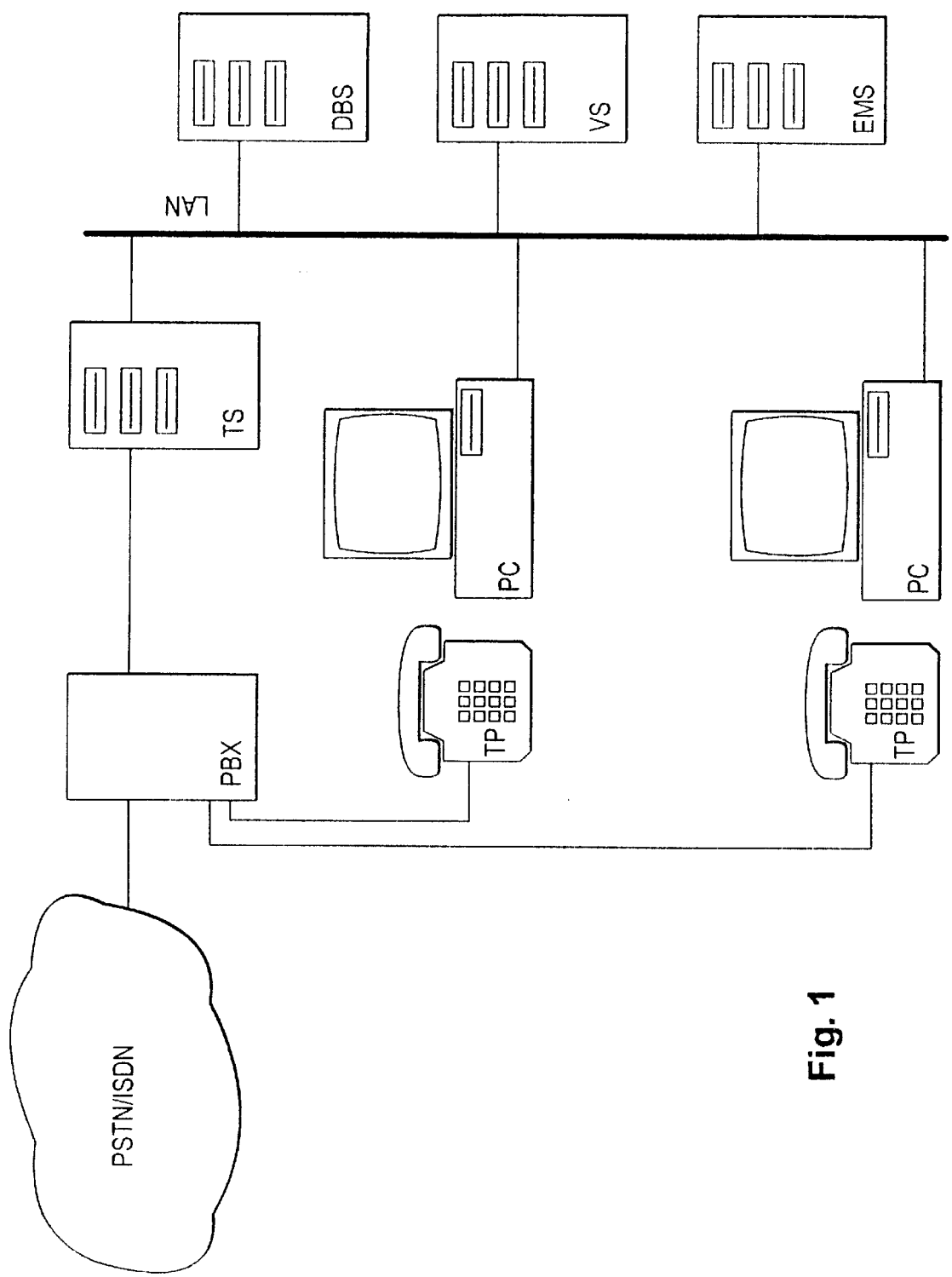
FIG. 1 presents traditional communication networks and terminal devices used in office environment.
Figure 2:
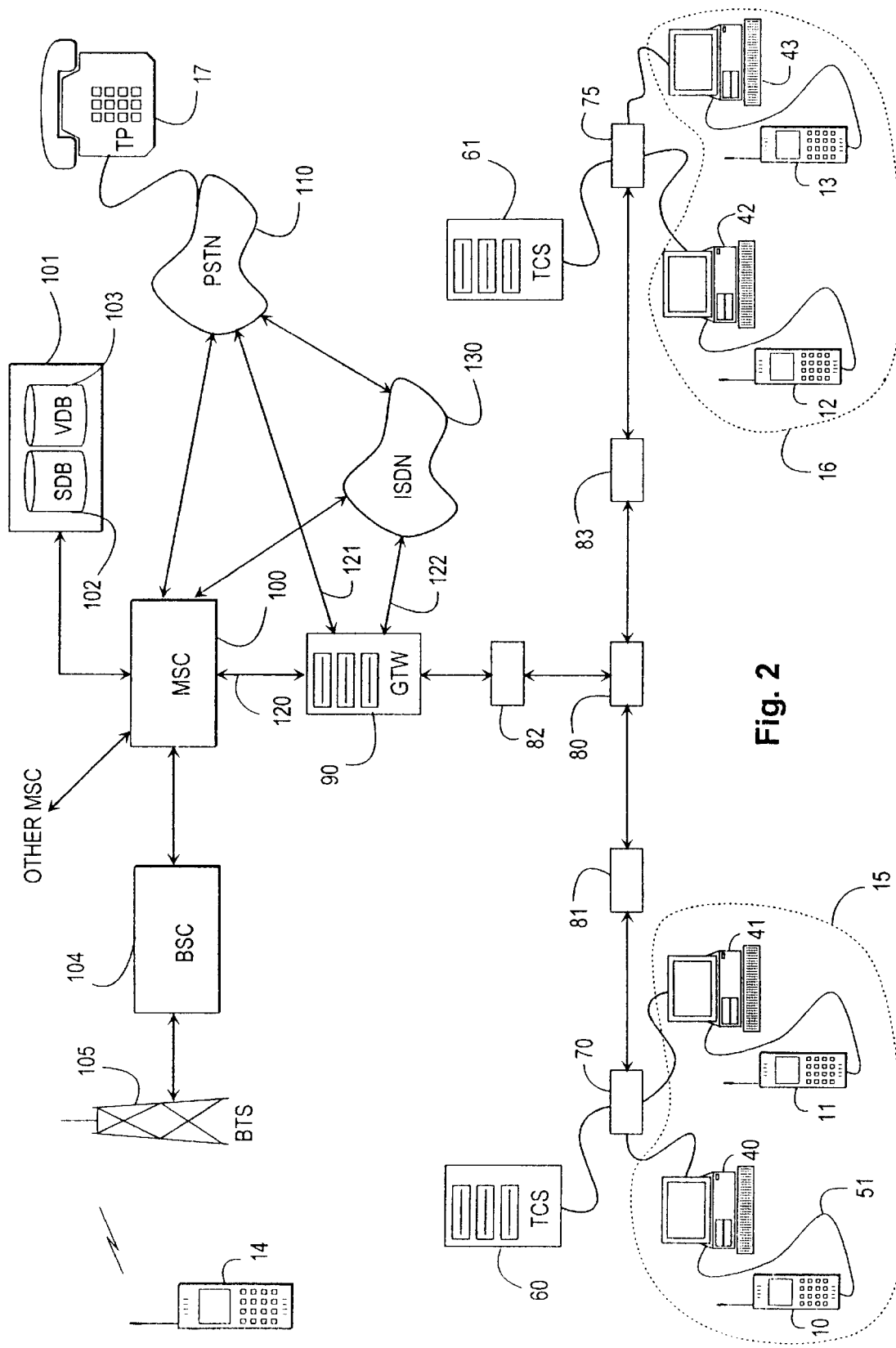
FIG. 2 presents a system according to the invention for transferring information within a data transfer network and from the data transfer network to telecommunication networks.
Figure 3A:
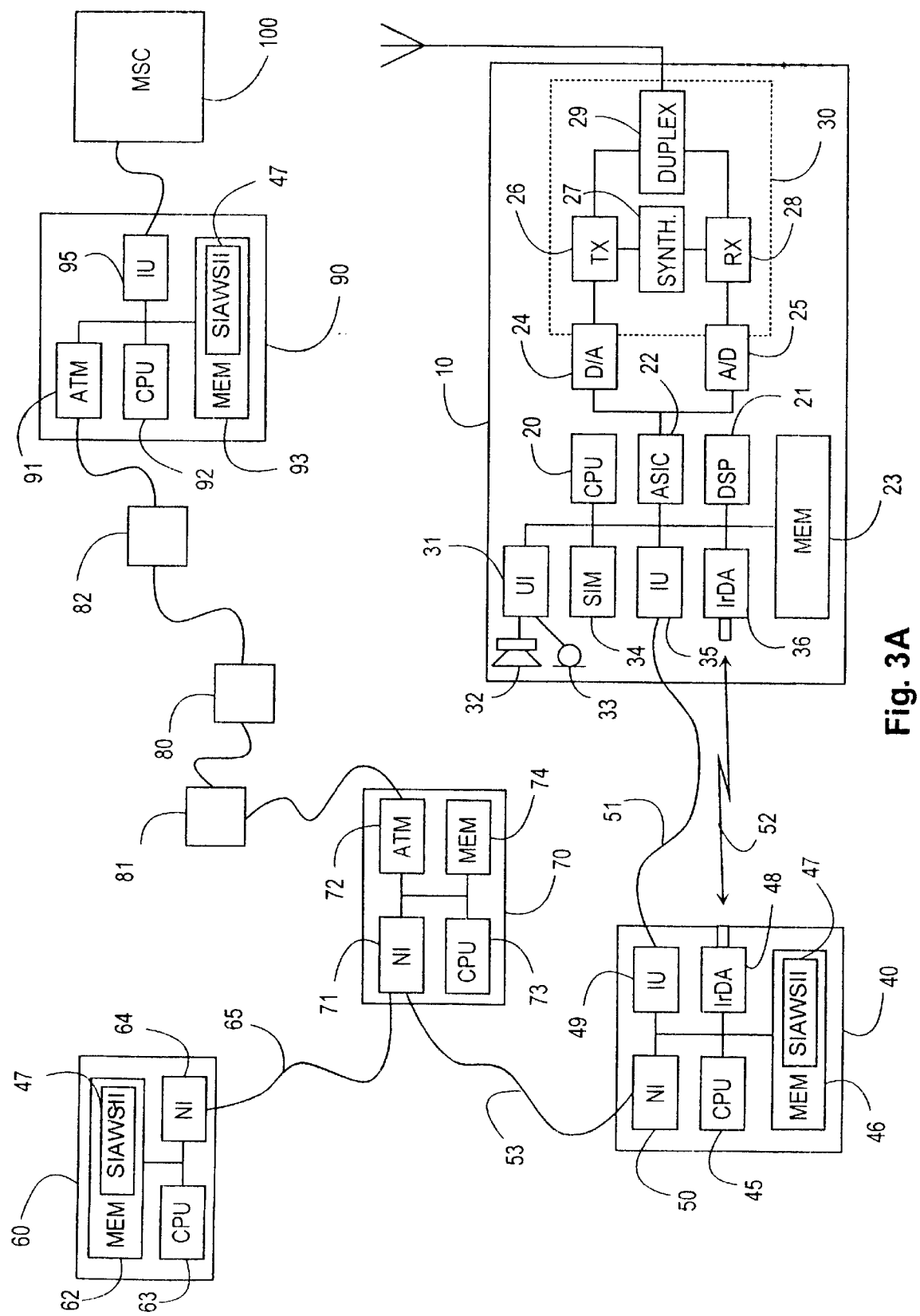
FIG. 3A presents in more detail the structure of the various parts of the information transfer system according to the invention as a block diagram.

FIG. 2 presents an example of an information transfer system according to the invention, comprising two telecommunication servers TCS (TeleCommunication Servers, Ref. 60, 61) controlling two sub-telephone systems 15, 16. Sub-telephone system 15 consists of two mobile stations 10, 11 and two terminal devices, to which mobile stations 10, 11 are connected e.g. either with interconnecting cable 51, or using infrared connection 52 (FIG. 3A). It is also possible to use, instead of interconnecting cable 51 or infrared connection 52, low power transceiver units (not shown in the figure) operating at radio frequencies, of which one is placed in mobile station 10, 11 and the other in terminal device 40, 41. The information transfer media used between mobile station 10, 11 and terminal device 40, 41 does not essentially have an effect on the operation of the information transfer system according to the invention.

In this embodiment of the information transfer system according to the invention sub-telephone systems 15, 16 and telecommunication servers 60, 61 are connected to a data transfer network using nodes 70, 71. Nodes 70, 71 are interconnected using e.g. an ATM-packet network consisting of ATM-switch 80 and repeaters 81, 82, 83. The ATM-packet network is further connected to network server GTW (Gateway, Ref. 90), which is responsible for the connections of mobile stations 10 to 13 within the ATM-network and in particular for connections to outside of the ATM-network. Connections to outside the ATM-network are realized e.g. using mobile communication switching center MSC (Mobile Services Switching Center) 100 prior known from GSM (Global System for Mobile Communication) mobile communication system. From mobile communication switching center 100 a call is further transferred to an outside the system mobile station, e.g. traditional mobile station 14, through base station controller 104 (BSC, Base Station Controller) and base stations 105 (BTS, Base Transceiver Station). Alternatively, a call can be transferred from network server 90 further over traditional wired telephone network 110 (PSTN, Public Switched Telephone Network) or e.g. through digital multi-service network 130 (ISDN, Integrated Services Digital Network). In this chapter, as well as in other parts of the explanation, a call means broadly a connection over telecommunication networks for transferring information between two terminal devices. In this context information means, except for calls, also among other things facsimile messages and GSM short-messages.

In the information transfer system according to the invention presented in FIG. 2, information transfer connections based upon ATM and GSM technologies have been utilized. It is fully possible to utilize instead of these techniques even other kind of information transfer connections. For example it is possible to arrange, instead of the ATM system, the information transfer connections between terminal devices 40 to 43, teleservers 60, 61 and network server 90 entirely e.g. using systems based upon Ethernet and Token Ring or future wide band networks. Correspondingly it is possible to realize, instead of GSM-system, an information transfer system according to the invention even in connection with other mobile communication systems, such as e.g. TDMA (Time Division Multiple Access), AMPS (Advanced Mobile Phone Service) and NMT (Nordic Mobile Telephone) systems.

FIG. 3A presents modules of mobile station 10, terminal device 40, telecommunication server 60, node 70 and network server 90. The structure of mobile station resembles that of a traditional mobile station, such as e.g. a GSM-mobile station. It comprises among other things processor 20 controlling the function of mobile station 10, signal processor 21 executing mainly time-critical operations, ASIC (Application Specific Integrated Circuit) -block 22, memory 23, D/A-converter 24, A/D-converter 25 and radio frequency part 30.

Mobile station 10 operates independently, that is when not connected to terminal device 40, exactly like ordinary mobile station 14. The functions performed by mobile station 10 have then been shared between processor 20 and signal processor 21 for example in such a way that processor 20 carries out mainly operations essential for communication between the mobile station and a base station requiring versatile processing, such as mobility management (e.g. change of base station), management of radio frequencies (transmission and reception frequencies) control of calls (handling of outgoing and incoming calls).

Figure 4A:
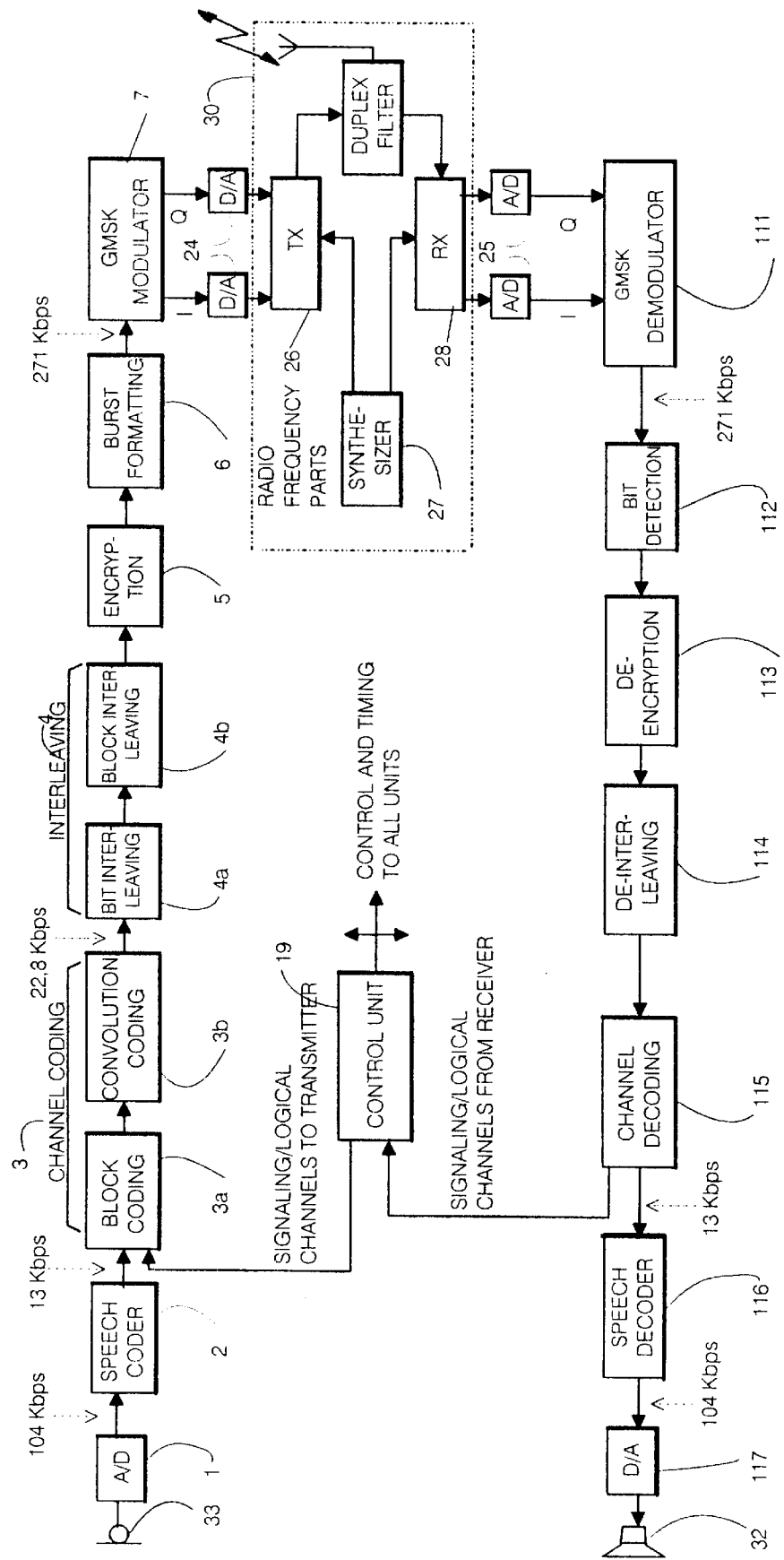
FIG. 4A presents the functional blocks of a traditional mobile station as a block diagram.

Correspondingly, signal processor 21 executes shares requiring real time processing of incoming and outgoing signals, such as channel encoding and channel decoding, interleaving and de-interleaving, and ciphering and deciphering. Mobility Management, management of radio frequencies (Radio Resource Management), control of calls (Call Control), channel encoding (Channel Coding), interleaving and de-interleaving, ciphering and de-ciphering are functional blocks prior known to a person skilled in the art, the functional connection of which will be presented in following chapters in connection with the explanation of FIG. 4A.

The presence of speech encoding and decoding in the operation of a mobile station is illustrated in the following, where, in order to make the invention understood, the operation of the transceiver of a cellular mobile communication system is explained. As an example, the transmitter and receiver functions of the European GSM-system based upon time division multi-use are explained referring to FIG. 4A, which presents the block diagram of a mobile station transceiver according to GSM system. The transceiver of a base station differs from that of a mobile station usually by being a multi-channel one and having no microphone and loudspeaker, in other respects it is in principle similar to the transceiver of a mobile station.

The first stage of a transmission sequence is digitizing 1 of analogue speech and encoding 2. Sampling with A/D-converter 1 is carried out at 8 kHz frequency and a speech encoding algorithm assumes an input signal to be of 13 bit linear PCM. The samples obtained from the A/D-converter are segmented into 160-sample speech frames of 20 ms duration each. Speech encoder 2 processes the 20 ms speech frames, meaning that before the beginning of encoding, 20 ms of speech is taken in a buffer. The encoding operations are carried out individually for each frame or for subframes of theirs (in 40 sample blocks). As a result of the encoding by speech encoder 2, 260 bits are obtained out of one frame.

After speech encoding 2, channel encoding 3 is carried out in two stages, when to begin with (260 bits) part of the bits (50 most significant) are protected using block code 3$a$ (=CRC, 3 bits) and after this these and the next most important bits (132) are further protected with convolution code 3$b$ (encoding ratio ½) (50+3+132+4)*2=378, and some of the bits are taken unprotected (78). As shown in FIG. 4, signaling- and logic messages come from control unit 19 controlling the blocks of the telephone, directly to block encoding block 3$a$, and naturally no speech encoding is done to these data messages. Correspondingly, at reception, the received signaling- and logic messages are taken from channel decoding block 115 to control unit 19. At block encoding 3a a queue of bits is joined at the end of a speech frame, with the help of which transfer errors can be detected at reception. At convolution encoding 3b the redundancy of a speech frame is enhanced. In all 456 bits are transmitted per each 20 ms frame.

These 456 bits are interleaved in block 44 and even interleaving 4 has two stages. At first, in block 4a, the order of the bits of a frame is shuffled and the shuffled bits are organized into eight blocks of equal size. The blocks are divided in block 4b further into eight subsequent TDMA frames, in which case the interleaved 456 bits are transmitted in eight time slots of the radio way (57 bits in each). The purpose of the interleaving is to spread transfers errors, which normally occur in error bursts, evenly over the whole transmitted data, in which way the channel encoding works most effectively. After de-interleaving an error burst is transformed into individual error bits which can be corrected at channel decoding. The next stage in a transmission sequence is data encryption 5. Encryption 5 is carried out using an algorithm which is one of the most guarded secrets of GSM. Encryption prevents unauthorized listening of calls, which is possible in analogue networks.

Encrypted data is formed 6 into a burst to be transmitted by adding into it a teaching sequence, tail bits and protection time. A burst to be transmitted is taken into GMSK-modulator 7 which modulates the burst for transmission. GMSK-modulation method (Gaussian Minimum Shift Key) is a constant-amplitude digital modulation method in which information is contained in changes of phase. Transmitter 26 mixes the modulated burst through one or more intermediate frequencies into 900 megahertz and transmits it through an antenna to radio way. Transmitter 26 is one of three radio frequency blocks 30. Receiver 28 is the first block of the receiving side and carries out functions inverse to transmitter 26. The third RF-block in synthesizer 27 which performs the generating of frequencies. GSM-system utilizes frequency jumping, in which transmission and reception frequencies are altered in each TDMA-frame. Frequency jumping improves the quality of a connection but sets strict requirements to synthesizer 27. Synthesizer 27 must be capable of moving from one frequency to another very quickly, in less than one millisecond.

At reception operations inverse to transmission are executed. After RF-receiver 28 and demodulator 111, bit detection 112 is carried out with e.g. a channel corrector, in which bits in received samples are detected, or in other words the transmitted bit sequence is tried to be found out. After the detection de-encryption 113 and de-interleaving 114 are carried out, and channel decoding 115 is performed on the detected bits and the error sums are checked using cyclic redundancy check (CRC, Cyclic Redundancy Check). At channel decoding 115 bit errors occurred in the transfer of the burst are attempted to be corrected. The 260 bit-long speech frame contains after channel decoding 115 the transmitted parameters describing speech, based upon which speech decoder 116 forms the digital samples of speech signal. The samples are D/A-converted 117 for reproduction with loudspeaker 32.

In the transceiver there is as the central controlling unit of the mobile station control unit 19 which essentially controls the above described blocks, coordinates their functions and controls timing. Control unit 19 comprises usually e.g. microprocessor 20 and ASIC-block 22. ASIC-block 22 takes care of the digital connection of the transmitted signal and the received signal. It comprises among other things buffer memories for transferring digital data to both directions (transmission/reception) and takes care of the digital modulation of data. ASIC (Application Specific Integrated Circuit) means an application specific integrated circuit which is manufactured in an integrated circuit factory to a customer's specification. In a mobile station ASIC-block 22 typically controls synthesizer 27, required clock signals 38, and controls power supply 39 together with processor 20. ASIC-block 22 is connected with D/A (Digital to Analog) -converter 24 and A/D (Analog to Digital) -converter 25 to radio frequency section 30.

Mobile station 10 communicates with the user utilizing user interface unit 31 (FIG. 3A, UI, User Interface) which comprises among other things loudspeaker 32, microphone 33 and a display (not shown in the figure). User interface unit 31 comprises also A/D-converter 1 for transforming a microphone signal into a digital form and D/A converter 117 for forming a loudspeaker signal, and required amplifiers. Mobile station 10 also comprises SIM (Subscriber Identification Module)- intelligence card 34 prior known to a person skilled in the art, which card contains among other things the user's telephone number.

In this embodiment of the information transfer system according to the invention it is possible to connect mobile station 10 and terminal device 40 to each other in a number of methods. One of the methods is to interconnect the devices using a mechanical wire connection using interface units IU (Interface Unit, FIG. 3A, references 35 and 49). The interconnection interface can be e.g. a serial port.

The advantage of a physical wire connection is among other things safe operation and the logical use, because a user directly sees whether mobile station 10 is connected to terminal device 40 or not. Another method of connecting mobile station 10 to terminal device 40 is to use e.g. wireless transfer 52 carried out in infrared wavelength range. A very common, and suitable for the purpose, data transfer protocol is IrDA (Infrared Data Association) -protocol prior known to a person skilled in the art. In this case data transfer 52 taking place in the infrared wavelength range is realized between infrared transceivers 36 and 48. It is also possible to realize the connection using low-power radio frequency transceiver units (not shown in the figure).

Figure 3B:
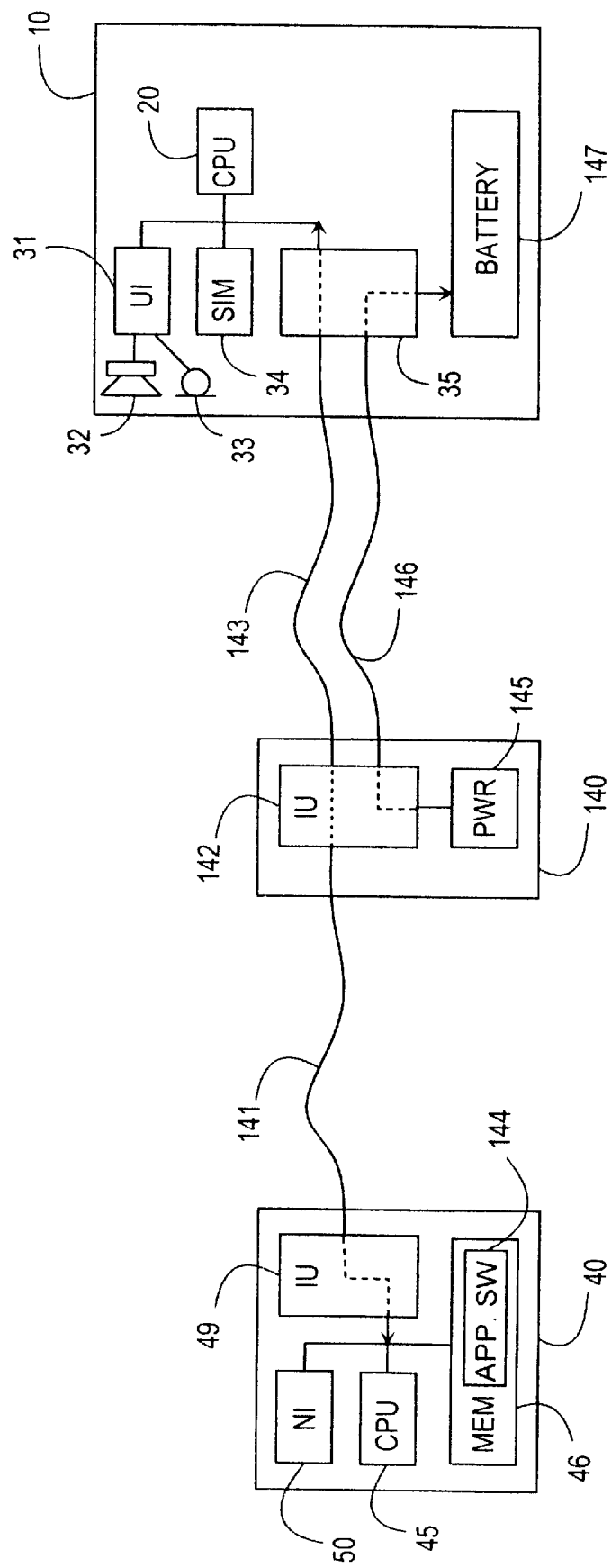
FIG. 3B presents connection of the mobile terminal to the terminal device using an intelligent charger.

In FIG. 3B there is shown an alternative way of connecting mobile station 10 according to the invention to terminal device 40. The connection is carried out by means of a connection device 140. This connection device 140 can be a cradle such as a desktop stand or desktop charger. Here, by way of example, the connection device is described by means of a charger called intelligent charger 140. The intelligent charger 140 is connected releaseably to terminal device 40 with physical conducting wire 141 and interface unit 142. Using same interface unit 142 and conducting wire 143 the intelligent charger 140 is also connected releaseably to mobile station 10 when mobile station 10 has been installed to intelligent charger 140. Conducting wires 141 and 143 form a bus for communication between terminal device 40 and mobile station 10 via intelligent charger 140. The connections illustrated by conducting wires 141 and 143 may as well implemented in other ways, e.g. by infrared connection or by electrical connectors or the connection device 140 may be integrated into the terminal device 40. Possible signalling between terminal device 40 and mobile station 10 in establishing the connection therebetween can be carried out using Hayes AT-commands (a de facto standard) under control of the processors 20, 45 of each of the devices. The control in the terminal device 40 for establishing a connection to the mobile station 10 and after an established connection is handled by the processor 45.

Such control operations can be implemented as an application software 144, which is executed by the processor. Interface 142 of intelligent charger 140 also includes means for arranging the charging voltage from power supply 145 to battery 147 of mobile station 10 via conducting wire 146. If the connection device 140 has no own power source, it can get and transfer power to the mobile station from the terminal device 40.

Terminal device 40 is e.g. a PC prior known from office environment or a workstation, which comprises among other things processor 45, memory 46 and network interface unit 50 (NI, Network Interface) for connecting terminal device 40 to local area network (LAN)(references 53 and 65). Nodes 70 and 71 are components prior known from ATM technique, the purpose of which is to transfer information between LAN (references 53, 65) and "the world outside". Nodes 70, 71 carry out the required protocol transforms, in this case the transforms from LAN-protocol to ATM-protocol. Nodes 70, 71 comprise among other things interface unit 71 for connection of node 70 to LAN-network 65, interface unit 72 for connection of node 70 to ATM-network 65, and processor 73 controlling the operation of node 70. Node 70 also comprises memory 74 used among other things for buffering the data to be transferred. Telecommunication servers 60, 61 are traditional network servers and telecommunication server 60 comprises among other things processor 63, memory 62 and network interface unit 64 for connection to LAN-network 65.

The information transfer system according to the invention is connected for example to mobile telephone exchange 100 over network server 90. Network server 90 has been designed to maintain the status data of mobile stations 10 to 13 belonging to the system and to control the operation of telecommunication servers 60, 61. If required, network server 90 can take over the functions of telecommunication servers 60, 61, e.g. if a fault occurs. Correspondingly, telecommunication servers 60, 61 have been designed in such a way that, if required, they can take over the responsibility to maintain the system, either one of them alone or various functions can be shared between telecommunication servers 60, 61. A network server comprises among other things processor 92, ATM-interface unit 91, memory 93 and interface unit 95 for connecting the device to mobile telephone exchange 100. In systems with highest degree of integration it is possible to concentrate the functions of telecommunication servers 60, 61 and network server 90 in one of terminal devices 40 to 43, in which case separate servers 60, 61, 90 are preferably not required.

Figure 5:
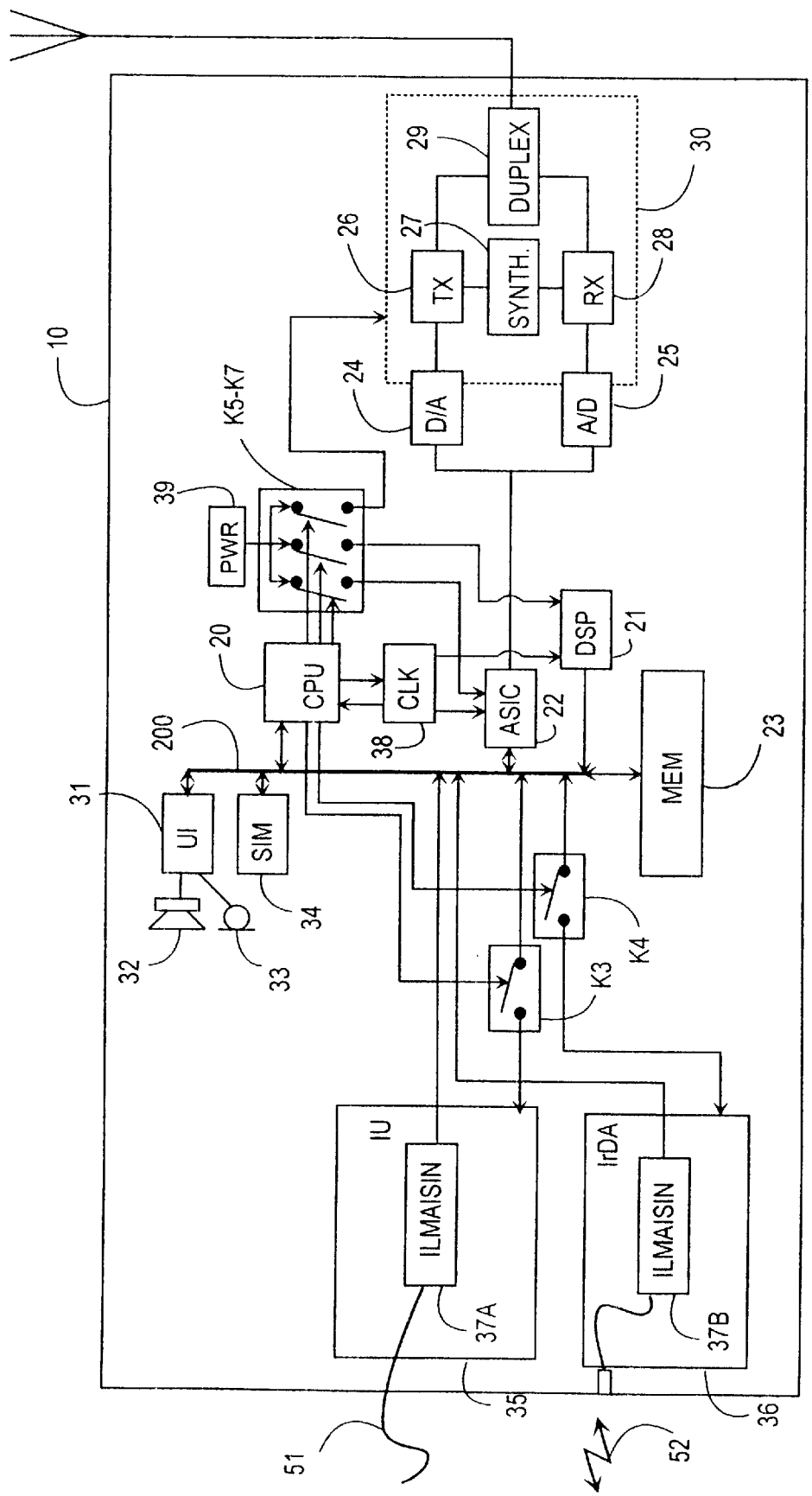
FIG. 5 presents the structure of a mobile station according to the invention, particularly components used for the power supply and control of components used for establishing radio connection, and components required for connection to a terminal device.

When mobile station 10 is connected to terminal device 40 in a way characteristic of the invention, e.g. using interconnecting cable 51 or infrared connection 52, several sub-functions of a traditional mobile station need preferably not be carried out. Among other things, radio frequency section 30 can be switched off, because in this case calls and data are transferred over wire connections. Switching is detected by both terminal device 40 and mobile station 10 and, depending on the switching method used, switching can be detected in a number of methods. When e.g. multi-core interconnecting cable 51 is used, one of the cores can be allocated for the indication signal. If e.g. in terminal device 40 said indication signal is connected to operating voltage (e.g. +5 V), mobile station 10 detects the switching in of mobile station 10 by monitoring the voltage level of the indication signal e.g. using level detector 37A (FIG. 5). Level detector 37A transfers the information e.g. over internal bus 200 to processor 20 controlling the system, controlled by which mobile station 10 and terminal device 40 go over to using wired information transfer connection over cable 51. A physical connection within mobile station 10 is established when processor 20 orders switch K3 to close. For example in order to save power, processor 20 can in this case switch off infrared transceiver 36 by opening switch K4 (if it was closed). In a corresponding way terminal device 40 can detect connecting to mobile station 10 by monitoring an indication signal of same type, the signal level of which a program installed in terminal device 40 polls in interface unit 49 at certain, predetermined intervals. Because said computer program executed in processor 45 and memory 46 can be run in the background, it does not have an essential effect in the other operation of terminal device 40. When the cable between mobile station 10 and terminal device 40 is disconnected, the processor of terminal device 40 detects the disconnection from interface unit 48 and processor 20 of mobile station 10 from interface units 35 using detector 37A. The connection can also be switched off manually from the user interface of terminal device 40 or from the user interface of mobile station 10.

If the connection between mobile station 10 and terminal device 40 is realized using an infrared connection, there also is a number of ways for detecting the connection. When the common IrDA (Infrared Data Association) protocol is used, connecting is detected e.g. based upon IAS (Information Access Service)-service, obligatory for devices according to IrDA standard, using detector 37B. IAS-service means a handshake operation between a device (in this application mobile station 10) and a server (in this application terminal device 40) in which a device can ask a server about services available. The most important information transferred at handshake is LSAP ID (Link Service Access Point), which defines the connection point at which the required service is available. It is this information that is required for a successful establishing of a contact. Processor 20 selects IrDA-connection 52 by closing switch K4. The wire connection is disconnected if required with switch K3. When infrared connection 52 is used, disconnection of connection 52 is detected correspondingly using infrared transceivers 36 and 48. If the connection is established using low-power transceiver units operating on radio frequency, the establishing and disconnection of a connection takes place according to same type of principle.

If the connection between mobile terminal 10 and terminal device 40 is established using intelligent charger 140, the processor 45 (executing the application software 144) of terminal device 40 is monitoring the establishment of the connection. The processor 45 checks periodically whether mobile station 10 has been installed to intelligent charger 140 or not. Alternatively the detecting of the establishment of the connection can be carried out by mobile station 10. In both alternatives this can easily be done e.g. by monitoring the voltage of a pin of a connector as was described above in relation to the embodiment without a separate connection device 140. After the connection has been established, mobile station 10 sends an information message to terminal device 40, in which it informs about the connection to intelligent charger 140. The terminal device 40 may acknowledge receipt of this message. Once connection is established call transfer is performed according to the invention. For example, when the terminal device is ready it sends via the intelligent charger 140 a call transferring order to mobile station 10, and the mobile station 10 performs the call transfer via the mobile network and sends a confirmation message to terminal device 40 on completion.

The following is the description of the operation of one embodiment of the information transfer system according to the invention when mobile station 10 has been successfully connected to terminal device 40, either using cable 51, infrared connection 52 or a pair of low-power radio transceivers. In order to that servers 60, 61, 90 can route calls (or other data in digital form, such as e.g. SMS- short messages) from mobile stations 10 to 13 connected to terminal devices 40 to 43 within the information system or from the information system to mobile communication switching center 100 or to fixed public telephone networks 110, 130, servers 60, 61, 90 must know telephone numbers 56 of each mobile station 10 to 13, and also the terminal device 40 to 43 in which they are connected. For the transfer of this information the information transfer system according to the invention uses specific information packet 47, which in the figures is abbreviated as SIAWSII (Specific Internet Address With Subscriber Identification Information). Information packet 47 is formed in the memory of terminal device 40, from which it is transferred further to servers 60, 61, 90 of the information transfer system. The following is a description of the forming of information packet 47 with reference to FIG. 6.

In the first stage (Ref. A, FIG. 6) processor 45 of terminal device 40 transmits to mobile station 10 a request to transmit the identification information stored in SIM (Subscriber Intelligent Module) intelligence card 34. This identification information essentially contains telephone number 56 of mobile station 10. Processor 20 of mobile station 10 forwards telephone number 56 from SIM-card 34 to processor 45 of terminal device 40, which saves it in memory 46. A part of memory space of its own in memory 46 has been allocated to information packet 47, of which space areas of their own have been reserved among other things for telephone number 56.

SIM-card 34 contains, in addition to telephone number 56, even information field 57 in which various kinds of information is stored. Some of this information is such which has been defined in GSM-standard and which is automatically stored by GSM-system and which a user cannot alter. An example of this kind of information is a list of available teleoperators, based upon which list a user can select the operator he wants, typically when traveling abroad. An important part of information field 57 of SIM-card 34 is also the part a user can use for e.g. storing telephone numbers and names. This makes it possible, among other things, that when SIM-card 34 is moved from one mobile station to another, the telephone numbers and names saved by a user himself are also moved without reprogramming them. It is possible to use information field 57 even for saving service specific settings. If some information saved in information field 57 is needed by servers 60, 61, 90, this information is included in the second stage (Ref. B) in information packet 47 by processors 20 and 45. If it is not known in advance whether any information contained in information field 57 is needed by servers 60, 61, 90, the whole information field 57 of SIM-card 34 can naturally be saved as a default value in information packet 47.

Figure 6:
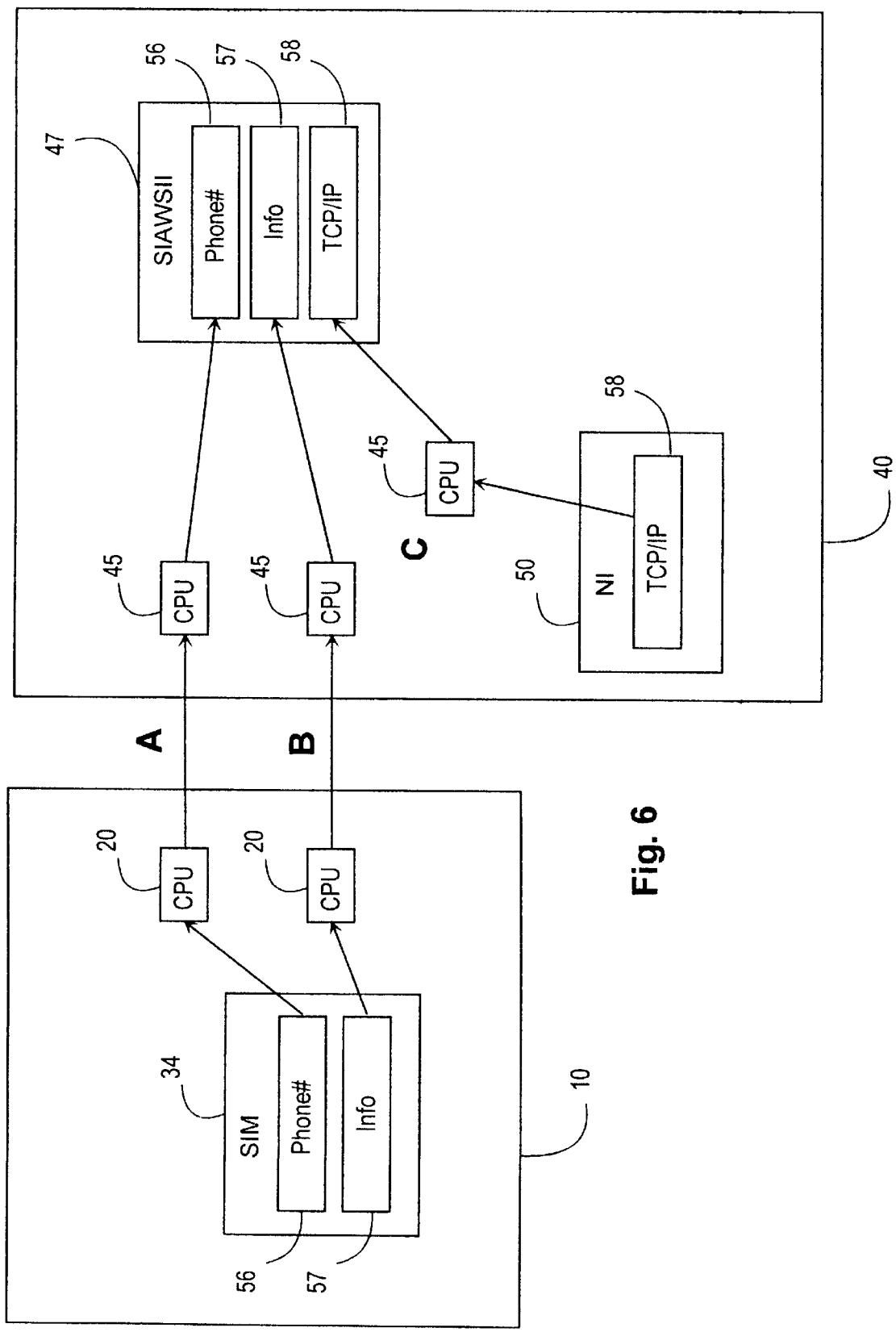
FIG. 6 presents in form of a diagram the forming of an information packet used for information transfer.

Terminal device 40, like e.g. all computers belonging to public telecommunication networks, has its own, individual TCP/IP (Transmission Control Protocol/Internet Protocol) -address. Based upon these TCP/IP-addresses different types of servers (including servers 60, 61, 90) are capable of routing messages between terminal devices connected to the network. FIGS. 3A and 6 present network interface 50 of terminal device 40, by means of which terminal device 40 is connected to LAN-network 53. TCP/IP-address 58 (FIG. 6) has for clearness been presented in connection with network interface 50, even if it normally is physically stored in memory 46 of terminal device 40. In the third stage of forming information packet 47 (FIG. 6, Ref. C) processor 45 of terminal device 40 saves TCP/IP-address 58 of terminal device 40 in the space allocated to it in memory packet 47.

In the information system according to the invention terminal device 40 transfers information packet 47 it has assembled further to telecommunication server 60 through local network 53, 65 (FIG. 3A). Telecommunication server 60 registers information packet 47 in its memory 61. Based upon this information packet 47 teleserver 60 knows among other things that mobile station 10 is connected to terminal device 40 having a certain TCP/IP-address 58 and what is the telephone number 56 of said mobile station 10. Telecommunication server 60 transfers information packet 47 further to network server 90 over e.g. ATM-network (references 72, 81, 80, 82, 91 describe components used for the transfer). Network server 90 registers information packet 47 in its memory 93. If mobile station 11, 12, 13 is connected to other terminal devices 41, 42, 43 of the system, they are automatically registered though information packets 47 in the memories of teleservers 60, 61 and network server 90 in a corresponding way. The arrangement is essentially hierarchic, meaning that teleserver 60 registers the TCP/IP-addresses 58 and the identification information of mobile stations 10 and 11, and telecommunication server 61 correspondingly those of mobile stations 12 and 13. Network server 90 in its turn registers mobile telephones 10 to 13 registered in telecommunication servers 60 and 61, that is all mobile stations 10 to 13 registered in the system. If problems occur it is however possible to change the hierarchy and telecommunication servers 60, 61 can cater for the tasks of network server 90 and vice versa. In the most integrated and most flexible information transfer system according to the invention it is possible to move the tasks of telecommunication servers 60, 61 and network server 90 to be performed by terminal devices 40 to 43. Network server 90 is connected to mobile communication switching center 100 or to telephone exchanges 110, 130 of fixed networks over wired connections 120, 121, 122. It is possible to realize said wired connections 120, 121, 122 e.g. as 2.048 Mbps PCM-transfer connections which provide 30 pcs. of 64 kbps information transfer channels each. In the preferable embodiment of the mobile communication network according to the invention each 64 kbps information transfer channel has been allocated an individual telephone number of its own in the exchanges. Based upon information packets originated in mobile stations 10 to 13 and saved in network server 90, network server 90 knows the mobile station telephone numbers 56 of mobile stations 10 to 13 according to the invention, and whether they are connected to terminal devices 40 to 43 of the system or not. Based upon this information processor 92 of network server 90 generates, if required (when a mobile station is connected to terminal device 40 to 43 and the information about this has been transferred to network server 90) a call transfer message with which it informs mobile communication switching center 100 that in future calls arriving to said mobile station telephone number shall be transferred to a certain telephone line connected to network server 90, instead of radio way. A call transfer message is a message prior known to a person skilled in the art, which even private persons can in general use in their own telephones if they are connected to a digital telephone exchange. After transferring the call transfer message to mobile communication switching center 100 processor 92 of network server 90 directs calls arriving to said telephone line through servers 60, 61 and terminal devices 40 to 43 further to the correct mobile station 10 to 13. After this mobile station 10 to 13 operates like a telephone in fixed telephone network, and radio parts typical for a mobile station need not be used. Telephone exchanges 100, 110, 130 operate as normal and no functional changes need be made in existing telephone exchanges 100, 110, 130. When mobile station 10 to 13 according to the invention is disconnected from terminal device 40 (or the connection is otherwise broken) processor 45 of terminal device 40 sends a message to telecommunication server 60 and further to network server 90, which delete the registering of mobile station 10 (information packet 47) from their memories 61, 93. In addition to this processor 92 of network server 90 further sends a message to mobile communication switching center 100 for canceling of the call transfer, and the logic wire connection between mobile station 10 and mobile communication switching center 100 is canceled entirely. Simultaneously when the connection from mobile station 10 to terminal device 40 is cut off, radio frequency part 30, ASIC-block 22 and signal processor 21 are activated to normal operating state by processor 20 of mobile station 10 through power supply unit 39 and clock generator 38. After this mobile station 10 seeks the best base station 105 in the normal way and transmits by radio through base station 105 and further through base station controller 104 its registration to the mobile communication network in the normal way. After this mobile station 10 according to the invention can transmit and receive messages through base station 105 like normal mobile station 14.

The call transfer may be performed differently compared to what is described above, especially when a connection device 140 (e.g. an intelligent charger) is used. This will be described in following. When terminal device 40 detects that the mobile station 10 has been connected to intelligent charger 140, terminal device 40 orders the mobile station 10 to make a call transfer to the IP address of terminal device. The signaling of the call transfer is done according to a standard characteristic to mobile station 10, like the signaling according to GSM-standard. In this case the call transferring message is transmitted to the mobile switching center 100 via mobile communication network without the need of the use of local area network 53, 65, telecommunication servers 60, 61 and network server 90 for the update of the location information of the mobile terminal. All the incoming calls are routed via network server 90, telecommunication servers 60, 61 and local area networks 53, 65. Calls out from mobile station 10 can be performed either via the same route or wirelessly via mobile communication network in a normal way, on basis of the desire of the user of the mobile station 10. In this embodiment of the invention there is no need to close the radio parts of the mobile station, because the possibility of charging the battery 147 all the time via conducting wire 146.

When mobile station 10 is disconnected from intelligent charger 140, both the processor 45 of the terminal device 40 and the mobile station 10 will detect it. On that moment the mobile station cancels the call transferring automatically by sending, e.g., a call transfer canceling message according to GSM standard via mobile communication network to mobile switching center 100.

The previous chapter handled a situation in which calls arriving at mobile station number 56 of a certain mobile station 10 are transferred over fixed telephone lines and data transfer networks (ATM, LAN) through terminal devices 40 to 43 further to terminal device 10 to 13 when mobile station 10 is connected to terminal device 40. This arrangement suits excellently situations in which mobile station 10 is mainly used as a normal mobile station outside office. In this case every arriving call is a mobile call, which typically the receiver (the user of mobile station 10) has to pay for. Extra cost can also be caused by outgoing calls, even if they in this information transfer system according to the invention are transferred without any information transfer by radio. The cost depends on the operators' price policy.

Another embodiment of the information transfer system according to the invention is better suited for situations in which mobile station 10 is used mainly connected to terminal device 40. In this case it is possible to reserve a telephone number in the fixed telephone network for each mobile station 10 to 13 and connect the lines permanently to a network server. Accordingly, mobile station 10 to 13 is used under the number of the fixed telephone network always when it is connected to the terminal device. If mobile station 10 to 13 is now disconnected from the terminal device, processor 92 of network server 90 generates a call transfer message to telephone exchange 110, 130 of the fixed telephone network, in which message it informs that in future calls (or other information) arriving to said line of fixed telephone network shall be transferred to the mobile telephone number 56 of mobile station 10 to 13 according to the invention. With this method mobile station 10 to 13 operates at the rates of the fixed telephone network always when it is connected to the terminal device. When mobile station 10 is reconnected to the terminal device, processor 92 of network server 90 sends a call transfer canceling message to telephone exchange 110, 130.

In the case of mobile communication switching center 100 location data and call transfers are stored in memory means 101 of mobile communication switching center 100, which means contain among other things subscriber register 102 (SDB, Subscriber Data Base) and a visitor register (Visitor Data Base). When processor 92 of network server 90 has successfully performed a call transfer, e.g. from mobile station number 56 of mobile station 10 to the temporary number allocated to it, it is possible to transfer an acknowledgment message to that effect to mobile station 10. The acknowledgment message is transferred, based upon the TCP/IP-address through network 91, 82, 80, 81 and local network 53 to terminal device 40, which in turn transfers the information to mobile station 10 connected to it over selected information transfer media (51, 52). Alternatively it is possible to transfer a message in case a call transfer is not successful, in which case mobile station 10 assumes that the call transfer was successful if said message has not arrived within a certain, predetermined time.

After stating a successful registering and a call transfer, e.g. based upon said acknowledgment message, processor 20 controlling the operation of mobile station 10 switches off among other things radio frequency part 30, because in future the transfer of calls is carried out through terminal device 40, as explained in more detail later on. In this embodiment of mobile station 10 according to the invention processor 20 switches off the power supply to radio frequency part 30 by switching off the power supply from power supply 39 with switch K7 (FIG. 5). Switching off the radio frequency parts eliminates problems caused by wireless information transfer within the office, such as interference and blocking situations eventually met by several users in a limited area, and avoids extra cost inflicted by the use of radio network. In addition to switching off the radio frequency parts 30, the processing capacity required by mobile station 10 is reduced, and particularly clock signals of signal processor 21 and ASIC-block 22 can be reduced or even temporarily be stopped entirely. Processor 20 controls the clock signals by controlling the operation of clock generator 38. If the services provided by signal processor 21 and the ASIC-block are not required at all, it is possible to switch off the power supply using switches K5 and K6. Together these operations reduce the need of power of mobile station 10 decisively, and accordingly the operating time of mobile station 10 according to the invention is long when connected to terminal device 40, even up to several weeks or months. If mobile station 10 is connected to terminal device 40 using connecting cable 51, it is possible to arrange even a charging voltage in connection with the connecting cable, in which case the battery (not shown in the figure) of the mobile station is charged when it is connected to terminal device 40.

The following is a description of the establishing of a connection and of information transfer between mobile stations 10 to 13 and mobile station 14 in certain exemplary cases. If the user of mobile station 10 (A-subscriber) of mobile station 10 registered in telecommunication server 60 and network server 90 calls a number (B-subscriber), processor 20 of the mobile station transfers this information and said number through terminal device 40 to telecommunication server 60. Telecommunication server 60 checks, based upon information packets 47 registered in its memory 61, whether the called number (B-subscriber) is registered in telecommunication server 60. If this is the case (as e.g. if B-subscriber is mobile station 11 connected to terminal device 41), the telecommunication server transfers the TCP/IP-address of B-subscriber to terminal device 40. Based upon this information terminal device 40 can establish, using TCP/IP-protocol, a connection through local network 53 to terminal device 41 belonging to sub-telephone system 15. When the connection is established, mobile stations 10, 11 connected to terminal devices 40, 41 can communicate with each other, or transfer e.g. speech or data, through local are network (LAN). This corresponds functionally to an internal call within a company, which traditionally would have been realized in a private telephone exchange.

Figure 4B:
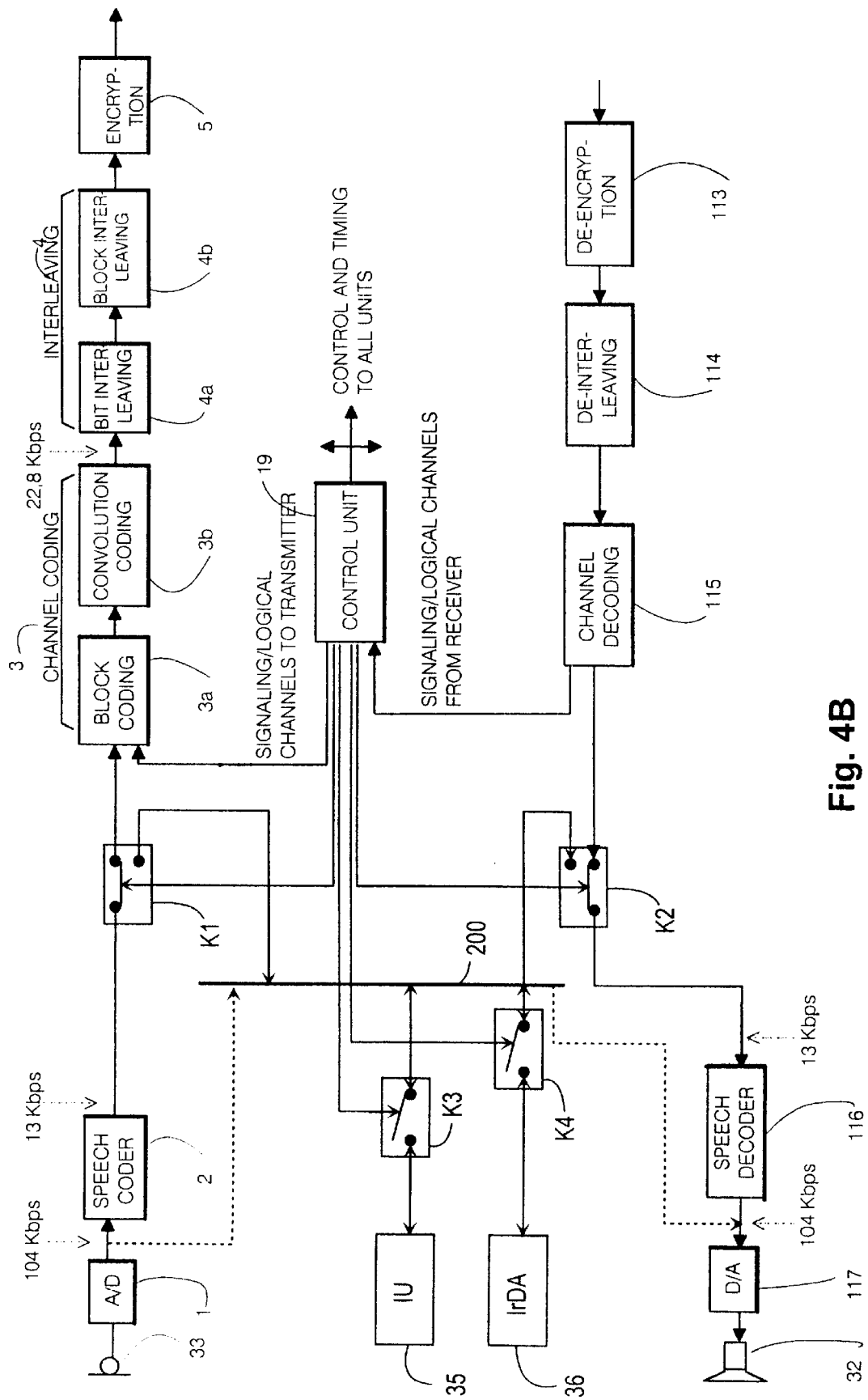
FIG. 4B presents information transfer routes in a mobile station and a information transfer system according to the invention.

The encoding of speech can be carried out using e.g. the coding method based upon RPE-LTP (Regular Pulse Excitation - Long-Term Prediction) -technique according to ETSI- (European Telephone Standard Institute) standard, prior known e.g. from GSM-mobile telephones, which technique is used also in speech transfer by radio. It encodes the speech to 13 kbps line speed. In this case the speech to be transmitted is transferred from speech encoder 2 (FIG. 4B) through switch K1 controlled by processor 20 to internal bus 200, not to channel encoding block 3, which would be the procedure if the speech would be transferred by radio. From internal bus 200 the outgoing speech is transferred through switches K3 and K4 controlled by processor 20 either to interface unit 35 or 36, and further to terminal device 40. Speech received from interface units 35 or 36 is transferred respectively through switches K3, K4, K2 controlled by processor 20 to speech encoder 116 and further through D/A-converter 117 to loudspeaker 32. It is also possible to use any other encoding method, such as ADPCM- (Adaptive Differential Pulse Code Modulation) encoding. In this case RPE-LTP-speech codecs 2, 116 are not needed and instead of them, speech can be transferred even directly from A/D-converter 1 to internal bus 200, and correspondingly from D/A-converter 117 to internal bus 200. In FIG. 4B this is illustrated using dashed lines. The speech encoding standard used does not require structural changes in the information transfer system according to the invention. It is also possible to use different speech encoding standards in the opposite directions and a connection even need not be a two-way connection. When some other digital information is transferred to interface units 35 or 36 instead of speech, it also takes place from internal bus 200 through switches K3 and K4 controlled by processor 20.

In the above described system terminal devices 40 and 41 transferred information through the local network directly between each other. Another alternative for establishing a connection is that telecommunication server 60 acts as an information intermediary between mobile stations 10 and 11 just like a telephone exchange, in which case mobile stations 10 and 11 have no direct connection.

If B-subscriber is not registered in sub-telephone system 15 of telecommunication server 60, it sends the number of B-subscriber further to network server 90. Network server 90 checks then based upon information packets 47 registered in its memory 93 whether B-subscriber has registered in any other sub-telephone system 16 of some other telecommunication server 61 of the information transfer system. If this is the case, network server 90 transfers the TCP/IP-address (saved in information packet 47) of B-subscriber to A-subscriber, in which case the establishing of connection between terminal device 40 and terminal device 42, 43 belonging to sub-telephone system 16 takes place in a way corresponding to the establishing of connection within sub-telephone system 15 described in the previous chapter. In this case mobile station 10 contacts mobile telephone 12, 13 through terminal device 40, node 70, repeater 81, ATM-switch 80, repeater 83, node 71 and terminal device 42, 43, as presented in FIG. 2.

If the number of B-subscriber is not found in information packets 47 of network server 90, B-subscriber has not registered in the information system according to the invention. In this case network server 90 relays the call of A-subscriber to mobile communication switching center 100 through cable 120 (alternatively the call can be transferred to traditional telephone exchanges 110 and 130 over cables 121 and 122). Network server 90 also performs the required standard conversions prior known to a person skilled in the art, such as GSM -audio encoding and the decoding of GSM -audio coding into the coding standard used in mobile communication switching center 100, e.g. such as 64 kbps PCM -coding standard. If 64 kbps PCM -coding is used directly for audio encoding in mobile stations 10 to 13, no protocol conversions needs to be carried out. In this case telecommunication networks are loaded naturally approximately five times more, but in high capacity telecommunication networks this brings no problems. For mobile communication switching center 100 this kind of a connection is alike a call coming from fixed telephone network 110, 130, but if required, it is possible to transfer even signalings characteristic of GSM standard between mobile communication switching center 100 and mobile station 10. In this way e.g. it is possible to transfer the real subscriber identification (telephone number 56 and information field 57 read from intelligence card 34) to B-subscriber in the method defined by GSM-standard.

By using signaling according to GSM-standard like in base station controller 104, network server 90 is from the point of view of mobile communication switching center 100 like any base station controller 104. In this case mobile communication switching center 100 transfers messages with mobile stations 10 to 13 just as if they were connected to the mobile communication network by radio like traditional mobile station 14. From mobile communication switching center 100 a call to B-subscriber, e.g. mobile station 14, is transferred as prior known by a person skilled in the art. No changes are needed in mobile communication switching centers 100, base station controllers 104 and base stations 105. If B-subscriber is a customer of wired network, e.g. traditional telephone network 110 or ISDN-network 130, a call is routed through these networks as normal.

The above is a description of the realization of the invention and its embodiments utilizing examples. It is self evident to a person skilled in the art that the invention is not limited to the details of the above presented embodiments and that the invention can be realized also in other embodiments without deviating from the characteristics of the invention. The presented embodiments should be regarded as illustrating but not limiting. Thus the possibilities to realize and use the invention are limited only by the enclosed claims. Thus different embodiments of the invention specified by the claims, also equivalent embodiments, are included in the scope of the invention.

We claim:

1. A system for transferring information, comprising a mobile station operating in a mobile communication network, which mobile station comprises first connecting means for establishing a telecommunication connection and transferring information between the mobile station and a subscriber terminal connected to telecommunication network through said mobile communication network, and means for directing calls to the mobile station on basis of a first identifier via the mobile communication network, wherein it further comprises a data communication network connected to the telecommunication network, a terminal device connected to the data communication network, second connecting means for connecting said mobile station into a functional connection with said terminal device, means for establishing a telecommunication connection and transferring information between said mobile station and said subscriber terminal through said terminal device and said data communication network, and means for directing calls to the mobile station on basis of a second identifier via said data communication network and said terminal device.

2. A system for transferring information according to claim 1, wherein it further comprises selecting means for selecting said telecommunication connection, which selecting means have been arranged to select a telecommunication connection between said mobile station and said subscriber terminal from the following telecommunication connections:

a telecommunication connection through said mobile communication network, and a telecommunication connection through said terminal device and said data communication network.

3. A system for transferring information according to claim 1, wherein it further comprises opening and closing means for opening and closing of said first connecting means, at connection of said mobile station into a functional connection to said terminal device using said second connecting means, said opening and closing means have been arranged to close said first connecting means, and at disconnection of said mobile station from the functional connection to said terminal device said opening and closing means have been arranged to open said first connecting means.

4. A system for transferring information according to claim 1, wherein said second connecting means comprise means for connecting said mobile station and said terminal device functionally to each other over an information transfer connection other than mobile communication network, and that mobile station comprises selecting means for selecting said information transfer connection.

5. A system for transferring information according to claim 1, wherein it further comprises a server connected to said data communication network and to the telecommunication network for connecting together said data communication network and said telecommunication network.

6. A system for transferring information according to claim 1, wherein it further comprises means for storing said second identifier.

7. A system for transferring information according to claim 6, wherein it further comprises a server connected to the data communication network, detecting means for detection of said mobile station and said terminal device being connected to each other, and said terminal device comprises means for transferring said second identifier through said data communication network further to said server as a response to the detection of said mobile station and said terminal device being connected to each other.

8. A system for transferring information according to claim 6, wherein it further comprises detecting means for detection of said mobile station and said terminal device being connected to each other, and said mobile station being arranged to make a call transfer via the mobile network to said second identifier as a response to the detection of said mobile station and said terminal device being connected to each other.

9. A system for transferring information according to claim 1, wherein it further comprises a connection device having a functional connection to said terminal device, and having means for connecting functionally to said mobile station.

10. A system for transferring information according to claim 1, wherein it further comprises a second mobile station, a second terminal device, and that said second mobile station is connected to said data communication network through said second terminal device, and that the system comprises means for establishing a telecommunication connection between said mobile station and said second mobile station through said data communication network.

11. A mobile station operating in a mobile communication network, comprising first connecting means for establishing a telecommunication connection and transferring information between said mobile station and a subscriber terminal connected to a telecommunication network through said mobile communication network, means for receiving calls on the basis of a first identifier via the mobile communication network, wherein said mobile station further comprises second connecting means for connecting the mobile station into a functional connection with a terminal device, which terminal device has a connection to a data communication network for establishing a telecommunication connection and for transferring information between said mobile station and said subscriber terminal through said terminal device and said data communication network, and means for receiving calls on the basis of a second identifier via said data communication network and said terminal device.

12. A mobile station according to claim 11, wherein it further comprises means for selecting said telecommunication connection from the following telecommunication connections:

a telecommunication connection through the mobile communication network, and a telecommunication connection through the terminal device.

13. A mobile station according to claim 12, wherein it further comprises detecting means for detection of the establishing and disconnection of a connection formed between the mobile station and said terminal device, when said detecting means detect the establishing of a connection between the mobile station and said terminal device through said second connecting means, said telecommunication connection selecting means have been arranged to automatically select for the telecommunication connection said telecommunication connection through the terminal device, and when said detecting means detect that the connection between the mobile station and the terminal device realized through the second connecting means is broken, said telecommunication connection selecting means have been arranged to automatically select for the telecommunication connection said telecommunication connection through the mobile communication network.

14. A mobile station according to claim 11, wherein said second connecting means comprise means for connecting said mobile station and said terminal device to each other through a data transfer connection other than the mobile communication network, and that the mobile station comprises selecting means for selecting the data transfer connection.

15. A mobile station according to claim 11, wherein it further comprises opening and closing means for opening and closing said first connecting means, when said mobile station is connected to a functional connection with said terminal device using said second connecting means, said opening and closing means have been arranged to close said first connecting means, and when said mobile station is disconnected from the functional connection to said terminal device, said opening and closing means have been arranged to open said first connecting means.

16. A mobile station according to claim 11, wherein the mobile station is connected to a terminal device with a wired connection, the mobile station comprises a battery, said wired connection comprises a voltage supply from said terminal device to the mobile station and said voltage supply has been arranged to charge the battery when the terminal device is connected to the mobile station with said wired connection.

\* \* \* \* \*